(12) United States Patent
Lamour et al.

(10) Patent No.: US 10,853,279 B2
(45) Date of Patent: Dec. 1, 2020

(54) SYSTEM AND METHOD FOR ACCESSING A SHARED RESOURCE

(71) Applicant: THALES, Courbevoie (FR)

(72) Inventors: Pierrick Lamour, Mérignac (FR); Alexandre Fine, Mérignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/577,543

(22) Filed: Sep. 20, 2019

(65) Prior Publication Data

US 2020/0104267 A1 Apr. 2, 2020

(30) Foreign Application Priority Data

Sep. 27, 2018 (FR) ...................................... 18 01004

(51) Int. Cl.
| | | |
|---|---|---|
| *G06F 13/40* | (2006.01) | |
| *G06F 3/06* | (2006.01) | |
| *G06F 13/16* | (2006.01) | |

(52) U.S. Cl.
CPC ...... *G06F 13/1668* (2013.01); *G06F 13/4027* (2013.01)

(58) Field of Classification Search
None
See application file for complete search history.

(56) References Cited

U.S. PATENT DOCUMENTS 8,943,287 B1 1/2015 Miller et al.
2014/0379953 A1 12/2014 Heyrman et al.

FOREIGN PATENT DOCUMENTS

WO WO 2010/139896 A1 12/2010
WO WO 2018/078610 A1 5/2018

OTHER PUBLICATIONS

French Search Report, from the French Patent Office in counterpart French Application No. 1801004, dated Jul. 16, 2019.

*Primary Examiner* — Scott C Sun
(74) *Attorney, Agent, or Firm* — Arent Fox LLP

(57) ABSTRACT

The invention relates to a system for accessing a shared resource belonging to a hardware platform comprising a plurality of master processing units, each master processing unit being able to exploit a shared resource during an execution of a process, each shared resource having an associated maximum bandwidth. For at least one shared resource, the system includes a counter of a number of data transfers between said master processing unit and said shared resource, and a comparator suitable for comparing the number of transfers to a bandwidth limit, which is a fraction of said maximum bandwidth, associated with said shared resource, and a pacing unit suitable for resetting each counter after a time period of predetermined duration has elapsed. The access system is suitable for commanding, once said number of transfers associated with a master processing unit has reached said bandwidth limit, a suspension of the exploitation of said shared resource by said master processing unit, and a resumption of the exploitation once each counter has been reset.

10 Claims, 2 Drawing Sheets

SYSTEM AND METHOD FOR ACCESSING A SHARED RESOURCE

CROSS-REFERENCE TO RELATED APPLICATIONS

This application claims priority to French Patent Application No. 18 01004 Sep. 27, 2018. The disclosure of the priority application is incorporated entirety herein by reference.

FIELD OF THE INVENTION

The present invention relates to a system and a method for accessing a shared resource belonging to a hardware platform comprising a plurality of master processing units.

The invention falls within the field of the exploitation of shared hardware resources, and is applicable in various industrial fields in which operating safety is critical. For example, it involves the automotive, aeronautics, nuclear and security server fields.

BACKGROUND OF THE INVENTION

In recent years, the use of hardware platforms, for example multi-master processors, has developed in particular in consumer electronics, for smartphones, tablets, computers. This type of platform supplies a computing power far superior to that of platforms with a single master or mono-master processing unit.

However, in fields of application where operating safety is critical, such multi-master hardware platforms are difficult to use, access to shared hardware resources by a plurality of processing units or master processes being able to lead to conflicts between competing accesses, and therefore uncontrolled execution durations of a process. Yet indeed, in certain applications, for example in an aircraft piloting system, it is critical to guarantee the execution of a process, for example of a piloting command within a given length of time.

Master processing units are units capable of exploiting a so-called slave resource, for example transferring binary data and/or querying a slave resource. A master processing unit is for example a core unit of a central processing unit (CPU), or a core unit of a graphics processing unit (GPU) or a direct memory access (DMA). The slave resources associated with the master units can be shared, for example the random-access memory (RAM) or a bus of the PCI Express® type.

The master processing units and the resources are connected via one or several communication buses, each communication bus having an associated bandwidth, the bandwidth designating the number of bits or bytes that can pass through the communication bus at the same time.

The access to a resource via a communication bus is characterized by a bandwidth, expressed in quantity of data per unit of time, for example in bytes per second, expressing the maximum quantity of data that can be sent and processed by this resource per unit of time.

The bandwidth associated with the slave resource limits the performance of a hardware platform.

The problem of conflicting access to shared resources is proportionate to the ratio between bandwidth of the peripheral and number of master processing units multiplied by their operating frequency.

In the state of the art, mechanisms exist for limiting access to the shared resources via token bucket. This technique requires active monitoring of exchanges, and therefore causes an implementation complexity.

There is therefore a need to allow access to shared resources on a multi-master platform while guaranteeing safety of operation.

SUMMARY OF THE INVENTION

To that end, the invention proposes a system for accessing a shared resource belonging to a hardware platform comprising a plurality of master processing units, each master processing unit being able to exploit a shared resource during an execution of a process, said exploitation comprising a plurality of data transfers between the master processing unit and the shared resource, each shared resource having an associated maximum bandwidth. This system includes, for at least one said shared resource:

for each master processing unit, a counter of a number of data transfers between said master processing unit and said shared resource, and a comparator configured for comparing the number of transfers to a bandwidth limit associated with said shared resource, said bandwidth limit being a fraction of said maximum bandwidth, a pacing unit configured for resetting each transfer number counter after a time period of predetermined length has elapsed, said access system being configured to command, once said number of transfers associated with a master processing unit has reached said bandwidth limit, a suspension of the exploitation of said shared resource by said master processing unit, and a resumption of the exploitation of said shared resource by said master processing unit once each counter has been reset.

Advantageously, the access system according to the invention makes it possible to guarantee shared access to a resource by all of the master processing units of the platform, and as a result to guarantee the execution of a process in a given amount of time, based on a number of predetermined time periods.

The system for accessing a shared resource according to the invention may also have one or more of the features below, considered independently or according to all technically conceivable combinations.

The system comprises, for each master processing unit, a command block suitable for commanding the suspension or resumption of the exploitation of said shared resource.

At least a part of said counters, said comparators, said command blocks and/or said pacing unit, is implemented by a dedicated processing unit of said platform.

At least a part of said counters, said comparators, said command blocks and/or said pacing unit, is implemented by one or several dedicated hardware mechanisms integrated into the hardware platform.

According to another aspect, the invention proposes a method for accessing a shared resource belonging to a hardware platform comprising a plurality of master processing units, each master processing unit being able to exploit a shared resource during an execution of a process, said exploitation comprising a plurality of data transfers between the master processing unit and the shared resource, each shared resource having an associated maximum bandwidth. The method includes, for at least one said shared resource:

for each master processing unit, an implementation of a counter of a number of data transfers between said master processing unit and said shared resource, and a comparison of the number of transfers to a bandwidth limit associated with said shared resource, said bandwidth limit being a fraction of said maximum bandwidth, a reset of each transfer number counter after a time period of predetermined length has elapsed, once said number of transfers associated with a master processing unit has reached said bandwidth limit, a command of a suspension of the exploitation of said shared resource by said master processing unit, and a resumption of the exploitation of said shared resource by said master processing unit once each counter has been reset.

The method for accessing a shared resource according to the invention may also have one or more of the features below, considered independently or according to all technically conceivable combinations.

The method includes a prior step for assigning each master processing unit a bandwidth limit associated with said shared resource.

When the hardware platform includes n master processing units, n being an integer greater than or equal to 2, and each bandwidth limit is equal to the maximum bandwidth associated with said shared resource divided by n.

Each bandwidth limit is calculated, for each master processing unit, based on at least one computing capacity of said master processing unit and the maximum bandwidth associated with the shared resource.

The bandwidth limit assignment includes, for a shared resource, a lower bandwidth limit assignment and an upper bandwidth limit assignment to each master processing unit, an assignment of a first bandwidth limit comprised between the lower bandwidth limit and the upper bandwidth limit, and a dynamic reassignment of a second bandwidth limit higher than the first bandwidth limit and lower than the upper bandwidth limit based on a number of excesses of the first bandwidth limit over successive time periods.

The method includes several reassignments of a second bandwidth limit, until the second bandwidth limit is equal to the upper bandwidth limit.

BRIEF DESCRIPTION OF THE DRAWINGS

Other features and advantages of the invention will emerge from the description thereof provided below, for information and non-limitingly, in reference to the appended figures, in which.

DETAILED DESCRIPTION OF EMBODIMENTS

Figure 1:
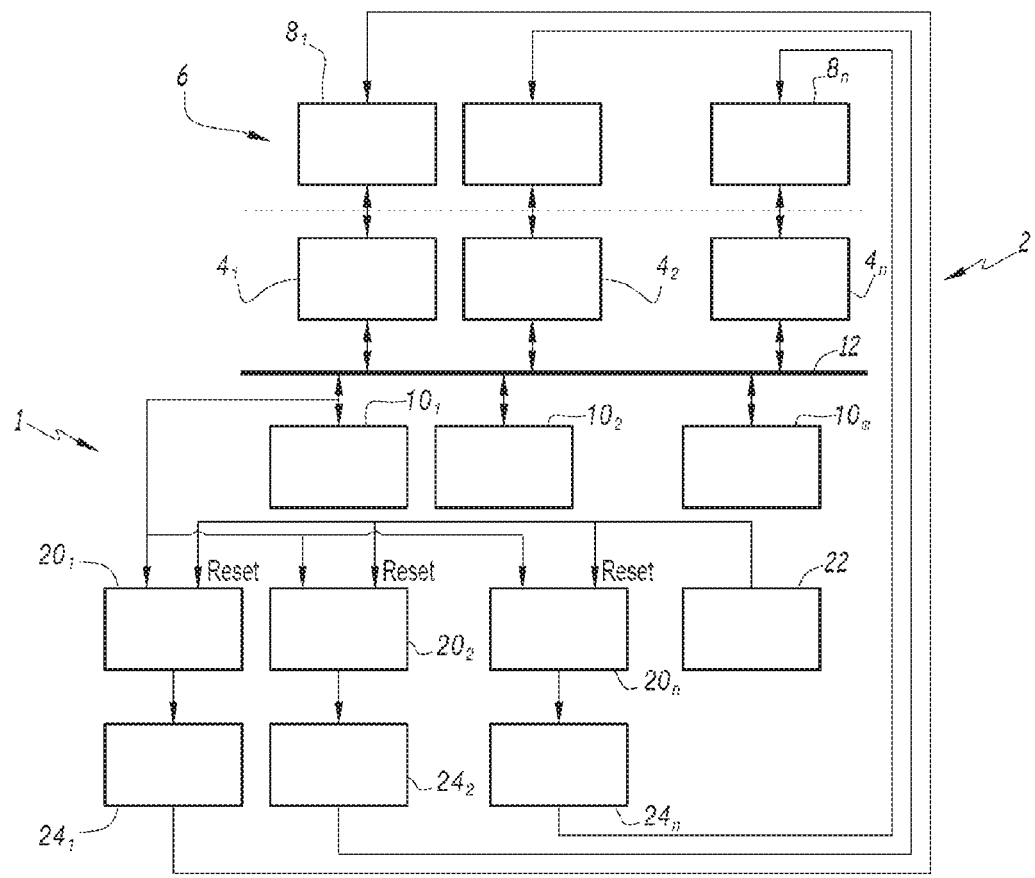
FIG. 1 is a block diagram of a system for accessing a shared resource in one embodiment.

FIG. 1 schematically shows the functional blocks of an access system 1 for accessing shared resources of a hardware platform 2, according to one embodiment of the invention.

The hardware platform 2 is described here generically, but has many applications. For example, it is applicable in the avionics field, where the needs for determinism are substantial. Other fields, such as finance, security-related servers, the automotive field (autonomous driving), are also fields of application.

The hardware platform 2 shown in FIG. 1 includes a plurality of master processing units $4_1$ to $4_n$.

As indicated in the introduction, a master processing unit is a unit capable of exploiting a so-called slave resource, for example transferring binary data and/or querying a slave resource. A master processing unit is for example: a core unit of a central processing unit (CPU), or a core unit of a graphics processing unit (GPU) or a direct memory access (DMA).

In one exemplary embodiment, the hardware platform 2 is a multicore central processing unit, and each master processing unit is a core of the multicore central processing unit. The number n of master processing units is a natural integer greater than or equal to two. For example, when the hardware platform 2 is a quad core processor, n=4.

The master processing units $4_1$ to $4_n$, are hardware units, suitable for executing processes controlled by commands or instructions with a low priority level coming from an operating system 6. It for example involves assembly-language instructions.

Functional blocks $8_1$ to $8_n$ of an access system 1 for accessing shared resources implement the assembly-language instructions suitable for commanding a suspension or a resumption of the exploitation of a shared resource by one of the master processing units, as described hereinafter.

The master processing units $4_1$ to $4_n$, are suitable for transferring data or sending instructions to the shared resources $10_1$ to $10_m$, which are slave resources. The number m of slave resources is a positive integer.

Reference $4_i$ designates any master processing unit among the units $4_1$ to $4_n$, and $10_j$ refers to any slave resource among the resources $10_1$ to $10_m$.

Slave resources are resources that receive instructions from master processing units and execute them.

For example, one of the shared slave resources referenced $10_1$ is a random-access memory (RAM), which is an electronic device suitable for storing binary data.

For example, it is a memory of type DDR3 SDRAM (for Double Data Rate 3rd generation Synchronous Dynamic Random Access Memory) or DDR4 SDRAM (for Double Data Rate 4th generation Synchronous Dynamic Random Access Memory), which are standardized by the JEDEC ("Joint Electron Device Engineering Council").

A master processing unit $4_i$ is suitable for exploiting the random-access memory $10_1$, by commanding data transfers, in write or read mode, by means of the main communication bus 12.

Each resource $10_j$ of the hardware platform 2, suitable for being used by each of the master processing units $4_1$ to $4_n$, has an associated maximum bandwidth $B_j$, expressed in quantity of data, for example number of bytes, per unit of time, for example per second.

The bandwidth expresses the quantity of data that can be transferred to the shared resource via the communication bus and processed per unit of time.

For example, for a random-access memory $10_1$, this resource is suitable for performing a number Tr of transfers per memory cycle, and a number N of memory cycles per second. The resource $10_1$ is therefore suitable for performing N×Tr transfers per second. This memory resource being accessible by a communication bus with bandwidth L in bytes, the bandwidth of the memory resource is L×N×Tr bytes per second.

The bandwidth associated with the memory resource is proportional to the number of transfers, the bandwidth L being constant.

According to one variant, the bandwidth associated with a memory resource is expressed in number of transfers per unit of time.

In one embodiment of the invention, the access system 1 for accessing shared resources includes units $20_1$ to $20_n$, which are counters for events transmitted by each master processing unit $4_1$ to $4_n$ to the shared resource $10_1$.

For example, each event is a data transfer in the case where the shared resource is a random-access memory. From a more general perspective, an event is a datum written or read between a master processing unit and a slave resource.

Preferably, each unit $20_1$ to $20_n$ is a native event counter integrated into the platform, for example to monitor the operation of each core of a multicore processor.

Furthermore, the system for accessing shared resources includes a periodic pacing block 22 (also called pacing unit), suitable for sending reset commands for each counter $20_1$ to $20_n$ after a time period of predetermined duration T has elapsed, for example set at 10 ms. Of course, this is a non-limiting example duration. The pacing block 22 is also connected to the functional blocks $8_1$ to $8_n$, so as to indicate the pacing of the time periods to these blocks.

The access system 1 for accessing a shared resource also includes units $24_1$ to $24_n$, which are comparators, each unit $24_i$ receiving a counter value of the unit $20_i$ corresponding to the processing unit $4_i$, and being suitable for comparing it to a bandwidth limit value $L_{i,1}$ associated with the processing unit $4_i$ for the exploitation of the resource $10_1$ by time period. Each unit $24_i$ is connected to a functional block $8_i$, suitable for commanding an associated processing unit $4_i$.

Upon receiving information relative to having reached the bandwidth limit value for the current time period coming from the unit $24_i$, the functional block $8_i$ commands a suspension of the exploitation of the considered shared resource by the master processing unit $4_i$, which is the resource $10_1$ in this example. The suspension of the exploitation comprises stopping data transfers to the memory $10_1$, and saving the execution context of the processing core $4_i$.

After the duration T corresponding to the time period has elapsed, the functional block $8_i$ commands the resumption of the exploitation of the resource $10_1$, and therefore the resumption of the execution of the process to be executed by the processing core $4_i$.

Each functional block $8_i$ is for example implemented by low-level priority instructions from the operating system.

In one embodiment, the units $20_1$ to $20_n$, $24_1$ to $24_n$, the periodic pacing block 22 and the functional blocks $8_1$ to $8_n$ are implemented by another processing core of the platform 2, separate from the processing units $4_1$ to $4_n$. For example, this is a secondary processing core of the multicore processor, dedicated to implementing a system for accessing a shared resource.

According to a variant, the units $20_1$ to $20_n$, $24_1$ to $24_n$, the periodic pacing block 22 and the functional blocks $8_1$ to $8_n$ are produced by dedicated hardware mechanisms, integrated into the platform, and the suspension is done directly by corresponding processing unit $4_i$.

According to another variant, a portion of the units mentioned above is produced by dedicated hardware mechanisms, and another portion by a dedicated processing core.

FIG. 1 illustrates the exploitation of the shared resource $10_1$, but a similar operation can be provided for the exploitation of each of the shared resources of the platform, or at least for some of them.

Figure 2:
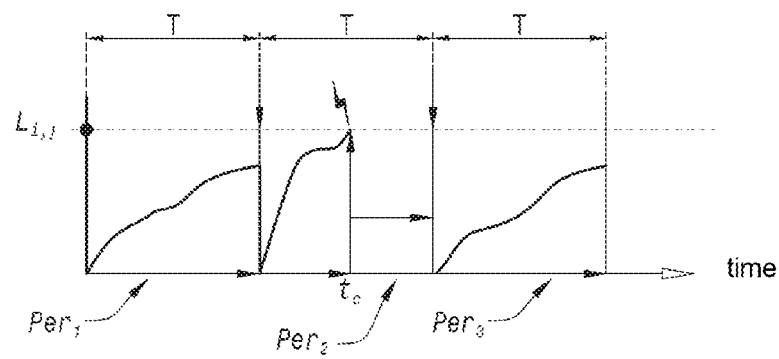
FIG. 2 is a schematic graph showing the usage limit of a shared resource by a master processing unit for a series of time periods.

FIG. 2 schematically illustrates the operation of a processing unit $4_i$ using a resource $10_j$ over three successive time periods denoted $Per_1$, $Per_2$ and $Per_3$, of predetermined duration T.

For example, the period T is set at 10 ms.

FIG. 2 illustrates a graph of the quantity of data transferred, obtained from the transfer number counter, to a slave resource, by successive time periods, based on a time axis on the x-axis. The bandwidth limit value $L_{i,j}$ is indicated by a horizontal dash.

During the first period $Per_1$, the data transfer number counter remains below the bandwidth limit value $L_{i,j}$. This counter is reset at the end of the first period.

During the second period $Per_2$, at a moment in time $t_c$, the bandwidth limit value $L_{i,j}$ associated with the master processing unit $4_i$ and the resource $10_j$ is reached. The process being executed is then blocked, and as a result the exploitation of the resource is suspended, until the end of the period $Per_2$ with duration T. This counter is reset at the end of the second period, and the exploitation of the resource is resumed in the following period.

During the third time period $Per_3$, the data transfer number counter remains below the bandwidth limit value $L_{i,j}$.

FIG. 2 is an illustration for one of the master processing units, but it represents the exploitation of the shared resource by each master processing unit in the access system 1 for accessing shared resources.

It will be understood that the implementation of the invention prevents a periodic overexploitation of a resource by each of the master processing units, and therefore prevents an engagement of the bandwidth associated with the exploited resource.

Figure 3:
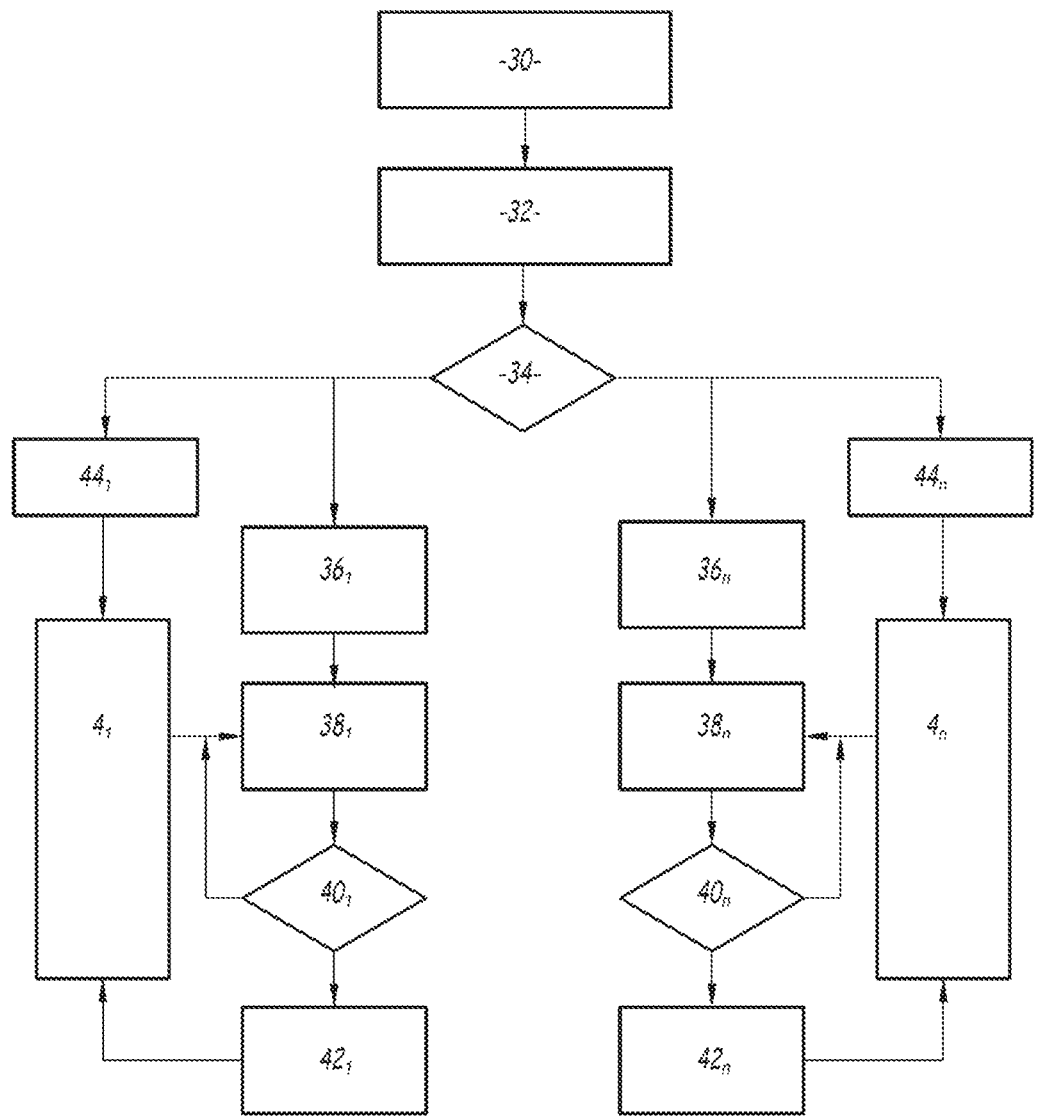
FIG. 3 is a block diagram of the main steps of a method for accessing a shared resource in one embodiment of the invention.

FIG. 3 is a block diagram of the main steps of a method for accessing a shared resource in a first embodiment of the invention, called static.

This method is described for access to a shared resource $10_j$ by a plurality of master processing units $4_1, \ldots, 4_i, \ldots, 4_n$.

In order to simplify the illustration, the steps associated with the master processing units $4_1$ and $4_n$ are shown, but it is understood that these steps are implemented similarly for each master processing unit $4_i$.

The method comprises a first step 30 for assigning each master processing unit $4_i$ a bandwidth limit $L_{i,j}$ associated with said shared resource $10_j$.

In this embodiment, the bandwidth limits $L_{i,j}$ are set beforehand statically, based on the maximum bandwidth $B_j$ of the resource $10_j$ in the hardware platform 2. For example, the bandwidth is expressed in number of transfers per unit of time, which is proportional to the quantity of data exchanged per unit of time.

For example, in one embodiment, the bandwidth limits $L_{i,j}$ are equal to a fraction of $B_j$: $L_{i,j}=B_j/n$.

According to one variant, the bandwidth limits are chosen specifically for each processing unit $4_i$, based on the processing capacities of each unit $4_i$. The sum of the bandwidth limits $L_{i,j}$ nevertheless remains less than or equal to the maximum bandwidth $B_j$ of the resource $10_j$.

The bandwidth limits $L_{i,j}$ are determined beforehand so as to use them in the comparators $24_i$.

The duration T of the time period is also predetermined, and stored in the pacing unit 22, which implements a time pacing 32.

At the beginning of a new time period of duration T (step 34), for each processing unit 4, a transferred data counter value $C_i$ is initialized at 0, in the reinitialization steps $36_1, \ldots, 36_n$ for the counter values.

Next, the counter values $C_i$ are increased in step $38_i$ (steps $38_1$ and $38_n$ illustrated in FIG. 3) based on data transfers from the associated master unit $4_i$, and the counter values $C_i$ are compared continuously in the comparison step $40_i$ (illustrated steps $40_1$ and $40_n$) to the bandwidth limit value $L_{i,j}$ previously assigned.

If the limit value is not reached, the transfer data count continues.

If the bandwidth limit value $L_{i,j}$ is reached, during the comparison $40_i$, an execution suspension command $42_i$ (illustrated steps $42_1$ and $42_n$) is sent to the processing unit $4_i$.

After a time period of duration T has elapsed, a command $44_i$ (illustrated steps $44_1$ and $44_n$) to resume execution is sent to the processing unit $4_i$. The execution resumption is done after the duration T has elapsed, and substantially in parallel with the reset of the counter values $C_i$ (steps $36_1$ to $36_n$).

According to a second embodiment of the invention, the bandwidth limit values are assigned dynamically.

In this second embodiment, each master processing unit $4_i$ is assigned, for the exploitation of a given resource, a lower bandwidth limit $L_{i,j,inf}$ and an upper bandwidth limit $L_{i,j,sup}$.

The bandwidth limits are chosen such that the sum of the upper bandwidth limits for all of the master processing units is less than or equal to the maximum bandwidth $B_j$ associated with the resource $10_j$.

During a startup of the exploitation of the shared resource, a first bandwidth limit assigned to the operation of the master unit is the lower bandwidth limit $L_{i,j,inf}$.

If this first limit is exceeded for several consecutive time periods, a second bandwidth limit, increased relative to the first bandwidth limit, is assigned to the master processing unit 4, while remaining less than or equal to the upper bandwidth limit $L_{i,j,sup}$.

In this second embodiment, a second counter for the number of successive excesses of a first bandwidth limit is established. The number of consecutive excess periods triggering an increase in the assigned bandwidth limit is a chosen parameter; for example, it is equal to 10.

In one embodiment, several successive increases are implemented until reaching the upper bandwidth limit. For example, the increase is done progressively, by increments, over a plurality of successive time periods, based on the number of excesses, in order to avoid a major increase in bandwidth limit associated with a same master processing unit over a same time period. In particular, if the second targeted bandwidth limit is the upper bandwidth limit $L_{i,j,sup}$, the increase in bandwidth is done over several time periods.

Advantageously, this allows smoothing of the dynamic increase in the bandwidth. Furthermore, this makes it possible to avoid any congestion of the exploitation of a shared resource due to the sudden increase of the bandwidth used by one or several of the master processing units.

Advantageously, in all of the embodiments, the invention makes it possible to guarantee the access to shared resources by several master processing units without congestion, and while guaranteeing an execution time of a given process.

The invention claimed is:

1. A system for accessing a shared resource belonging to a hardware platform comprising a plurality of master processing units, each master processing unit being able to exploit a shared resource during an execution of a process, said exploitation comprising a plurality of data transfers between the master processing unit and the shared resource, each shared resource having an associated maximum bandwidth, comprising, for at least one said shared resource:

for each master processing unit, a counter of a number of data transfers between said master processing unit and said shared resource, and a comparator configured for comparing the number of transfers to a bandwidth limit associated with said shared resource, said bandwidth limit being a fraction of said maximum bandwidth, a pacing unit configured for resetting each transfer number counter after a time period of predetermined length has elapsed, said access system being configured for commanding, once said number of transfers associated with a master processing unit has reached said bandwidth limit, a suspension of the exploitation of said shared resource by said master processing unit, and a resumption of the exploitation of said shared resource by said master processing unit once each counter has been reset.

2. The system according to claim 1, comprising, for each master processing unit, a command block configured for commanding the suspension or resumption of the exploitation of said shared resource.

3. The system according to claim 2, wherein at least part of said counters, said comparators, said command blocks and/or said pacing unit is implemented by a dedicated processing unit of said hardware platform.

4. The system according claim 2, wherein at least a part of said counters, said comparators, said command blocks and/or said pacing unit is implemented by one or several dedicated hardware mechanisms integrated into the hardware platform.

5. A method for accessing a shared resource belonging to a hardware platform comprising a plurality of master processing units, each master processing unit being able to exploit a shared resource during an execution of a process, said exploitation comprising a plurality of data transfers between the master processing unit and the shared resource, each shared resource having an associated maximum bandwidth, the method comprising, for at least one said shared resource:

for each master processing unit, an implementation of a counter of a number of data transfers between said master processing unit and said shared resource, and a comparison of the number of transfers to a bandwidth limit associated with said shared resource, said bandwidth limit being a fraction of said maximum bandwidth, a reset of each transfer number counter after a time period of predetermined length has elapsed, once said number of transfers associated with a master processing unit has reached said bandwidth limit, a command of a suspension of the exploitation of said shared resource by said master processing unit, and a resumption of the exploitation of said shared resource by said master processing unit once each counter has been reset.

6. The method according to claim 5, comprising a prior step for assigning each master processing unit a bandwidth limit associated with said shared resource.

7. The method according to claim 6, wherein the hardware platform includes n master processing units, n being an integer greater than or equal to 2, and wherein each bandwidth limit is equal to the maximum bandwidth associated with said shared resource divided by n.

8. The method according to claim 6, wherein each bandwidth limit is calculated, for each master processing unit, based on at least one computing capacity of said master processing unit and the maximum bandwidth associated with the shared resource.

9. The method according to claim 6, wherein said bandwidth limit assignment includes, for a shared resource, a lower bandwidth limit assignment and an upper bandwidth limit assignment to each master processing unit, an assignment of a first bandwidth limit comprised between the lower bandwidth limit and the upper bandwidth limit, and a dynamic reassignment of a second bandwidth limit higher than the first bandwidth limit and lower than the upper bandwidth limit based on a number of excesses of the first bandwidth limit over successive time periods.

10. The method according to claim 9, including several reassignments of a second bandwidth limit, until the second bandwidth limit is equal to the upper bandwidth limit.

\* \* \* \* \*